March 19, 1957 W. R. COLEMAN, JR 2,785,508
FLOWER POT COLLAR PLANT PROTECTOR
Filed June 22, 1954
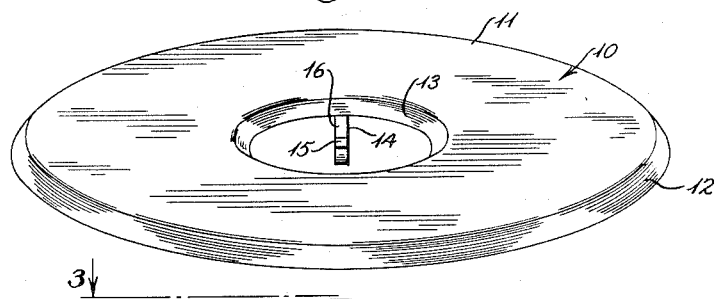
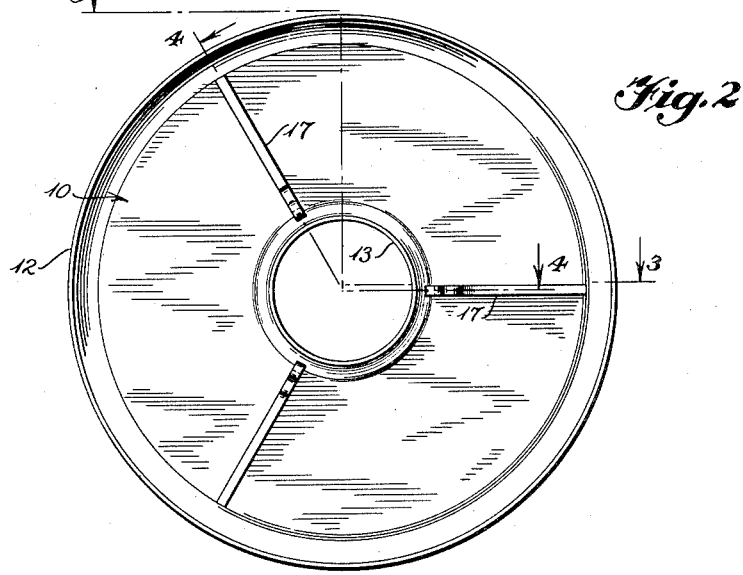
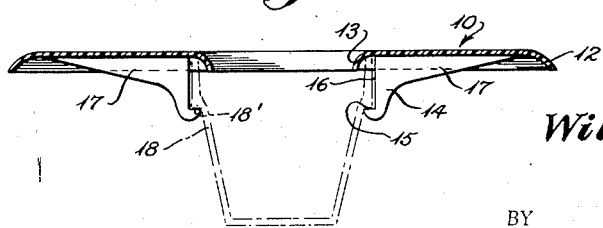
INVENTOR
*William R. Coleman, Jr.*
BY *Beale and Jones*
ATTORNEYS

United States Patent Office 2,785,508
Patented Mar. 19, 1957

2,785,508

FLOWER POT COLLAR PLANT PROTECTOR

William R. Coleman, Jr., Gadsden, Ala.

Application June 22, 1954, Serial No. 438,458

1 Claim. (Cl. 47—34)

My invention is directed to a plant leaf and stem protector that fits over the top of a flower pot.

In the raising of potted plants whose leaves and possibly the stems are low and hug the edge of a flower pot, such as African violet plants, the stems and leaves become injured by contacting the rim of the pot and even the soil. This injury is thought to occur through absorption of certain salts which form on the rim of the ceramic flower pot. Sometimes the stems and leaves contact the soil in the flower pot and a similar absorption of harmful chemicals from the soil occurs.

It is an object of my invention to provide a protector for the leaves and stems that may be attached to the top of a flower pot.

Another object of my invention is to provide a protector that has an annular area and a planar surface such that it may be slipped over the top of a flower pot and will not only protect the leaves and stems from the rim of the flower pot but provides an encircling platform about the flower pot to support any over-hanging stems and leaves.

Another object of my invention is to provide a protector that is annular and dish-like and has a down-turned internal annular lip which fits over the rim of a flower pot and has a plurality of spoke-like spaced apart support ribs underneath the protector that terminate short of the internal annular lip and are adapted to fit over the external peripheral upper rim portion of a flower pot and hold the protector in place.

Still further objects and the entire scope of applicability of the present invention will become apparent from the detailed description given hereinafter; it should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

For a more complete understanding of the nature and scope of my invention, reference may be had to the drawing and written description, in which, Fig. 1 is a perspective view of the top of the protector showing the central aperture and one of the underneath support elements;

Fig. 2 is a plan view of the protector as viewed from underneath the same;

Fig. 3 is a view partially in section as seen along line 3—3 of Fig. 2; and

Fig. 4 is a sectional view of the protector as viewed along line 4—4 in Fig. 3 installed on a miniature flower pot shown in broken lines.

Throughout the description that follows and in the various figures of the drawing, like reference numerals refer to similar parts.

The protector is generally indicated at 10 and is moulded or otherwise formed of a plastic material that is relatively hard yet is sufficiently resilient to permit its installation onto a flower pot. Such a material may be a synthetic or artificial resin and as such it will not transmit the harmful chemicals that may adhere to the rim and be present in the top soil surface in the flower pot.

The protector has a planar annular portion 11 with a downturned outer rim 12 and a downturned annular lip 13 at the center, the latter of which fits down over the top of a flower pot 18 such as illustrated in Fig. 4. This planar platform 11 forms a support for the stem and leaves of a plant and the inner annular lip 13 extends down over the upper rim of the flower pot in a protective manner.

Integrally formed on the underneath side of the annular platform 11 are three equally spaced supports 17 which extend out from underneath the lip 13 in spoke-like fashion. The supports 17 increase in vertical height from their outer extremities under the lip 12 and terminate in a vertical face 16 which is adapted to rest against the outer periphery of the usual vertical outer side wall of a flower pot such as illustrated best in Fig. 4. The lower part of the upper portion of the flower pot has a horizontal shoulder 18'. The supports 17 have an inwardly extending terminal portion contiguous to their portion 14 which has a horizontal lip 15 extending transverse to the vertical edge 16 and is adapted to ride under the horizontal shoulder 18' of the flower pot 18.

Still referring to the support members 17, it will be observed that their inner portion at 14 is somewhat triangular in shape. The lips 15 on the supports 17 at the lower apex of this triangular portion 14 will yield sufficiently to permit the installation of the protector over the top of the flower pot. The lips 15 will snap in place on the flower pot 18 in their installed position underneath the shoulder 18' on the flower pot 18.

This protector that is easily installed over the top of the conventional flower pots serves as a support for the leaves and stems of potted plants. The protector may be of various colors. It serves to hold the leaves and stems out of contact with the rim of the flower pot and the surface of the soil and thereby prevents the leaves from becoming injured.

I claim as my invention:

A flower pot collar which acts as a protector in holding the stems and leaves of plants out of contact with the soil and rim of a flower pot, said flower pot having a peripheral and generally vertical wall at its upper end, said wall terminating at its bottom in a generally horizontal surface, said collar comprising an annular planar member having a top and a bottom surface and an annular planar portion width approximately equal to the diameter of such flower pot, said collar being formed of a nonabsorbent material to support leaves and stems and having an inner downturned lip adapted to fit over the rim of such flower pot and of such height as to extend down into the flower pot and terminate above the soil normally used in said pot, and a plurality of spaced apart radially extending ribs integrally formed on the bottom surface of the planar member, each rib being approximately rectangular in vertical cross section taken perpendicular to the radially extending direction of the rib and having the longer dimension of said cross section extending vertically, said ribs tapering in vertical height at their inner ends and stiffening said annular portion of the collar, said inner ends being in spaced relation outward of said inner downturned lip and adapted to abut against the vertical wall of such flower pot to position and stabilize the collar, the inner lower ends of said ribs terminating in an inwardly extending horizontal shoulder spaced vertically down from said lip and adapted to fit underneath the lower surface of the upper peripheral wall of the flower pot when the top of said peripheral wall is contacted by the adjacent bottom surface of the planar portion of said annular member, said ribs being yieldable whereby said ribs permit installation of the collar over the flower pot and springing in place of said shoulders on said ribs onto the lower surface of the upper peripheral wall of the flower pot.

References Cited in the file of this patent

UNITED STATES PATENTS

| | | |
|---|---|---|
| 62,728 | Booker | Mar. 12, 1867 |
| 205,252 | Dalany | June 25, 1878 |
| 274,219 | Parsons | Mar. 20, 1883 |
| 1,599,525 | Hanson | Sept. 14, 1926 |
| 1,832,585 | Sample | Nov. 17, 1931 |
| 1,959,800 | Rogge | May 22, 1934 |
| 2,246,490 | Flues | June 24, 1941 |

FOREIGN PATENTS

| | | |
|---|---|---|
| 447,172 | Great Britain | May 13, 1936 |
| 830,881 | France | Aug. 11, 1938 |